United States Patent
Han et al.

(10) Patent No.: US 11,898,115 B2
(45) Date of Patent: Feb. 13, 2024

(54) NITROGEN-CONTAINING TERPOLYMER BIODIESEL SOLIDIFICATION POINT DEPRESSANT, AND PREPARATION METHOD AND APPLICATION THEREOF

(71) Applicant: SHANGHAI INSTITUTE OF TECHNOLOGY, Shanghai (CN)

(72) Inventors: Sheng Han, Shanghai (CN); Suya Yin, Shanghai (CN); Dongyuan Jin, Shanghai (CN); Xian Zhu, Shanghai (CN); Taishun Yang, Shanghai (CN); Mingxia Yuan, Shanghai (CN); Xin Li, Shanghai (CN); Hualin Lin, Shanghai (CN); Yuan Xue, Shanghai (CN)

(73) Assignee: SHANGHAI INSTITUTE OF TECHNOLOGY, Shanghai (CN)

( * ) Notice: Subject to any disclaimer, the term of this patent is extended or adjusted under 35 U.S.C. 154(b) by 0 days.

(21) Appl. No.: 17/927,724

(22) PCT Filed: May 27, 2021

(86) PCT No.: PCT/CN2021/096332
§ 371 (c)(1),
(2) Date: Nov. 24, 2022

(87) PCT Pub. No.: WO2021/244388
PCT Pub. Date: Dec. 9, 2021

(65) Prior Publication Data
US 2023/0242827 A1 Aug. 3, 2023

(30) Foreign Application Priority Data
Jun. 2, 2020 (CN) .......................... 202010489249.9

(51) Int. Cl.
*C10L 10/14* (2006.01)
*C10L 10/16* (2006.01)
*C10L 1/238* (2006.01)

(52) U.S. Cl.
CPC ............. *C10L 1/2381* (2013.01); *C10L 10/16* (2013.01); *C10L 2200/0476* (2013.01)

(58) Field of Classification Search
CPC .. C10L 10/16; C10L 10/14; C10L 2200/0476; Y02E 50/10
See application file for complete search history.

(56) References Cited

U.S. PATENT DOCUMENTS 7,473,284 B2 * 1/2009 Krull ....................... C10L 1/146
44/393

FOREIGN PATENT DOCUMENTS

| CA | 10576022 A | 4/2019 |
| CN | 103131487 A | 6/2013 |

(Continued)

OTHER PUBLICATIONS

Machine Translation of CN110172366A (Year: 2019).*
(Continued)

*Primary Examiner* — Ellen M Mcavoy
*Assistant Examiner* — Ming Cheung Po
(74) *Attorney, Agent, or Firm* — Zhu Lehnhoff LLP

(57) ABSTRACT

The present invention relates to a nitrogen-containing terpolymer biodiesel solidification point depressant, and a preparation method and application thereof. The preparation method includes the following steps: 1) respectively preparing methylacrylic acid high carbon ester and N-hexadecyl methacrylamide; 2) adding the methylacrylic acid high carbon ester, the N-hexadecyl methacrylamide, and vinyl acetate to a solvent, and adding an initiator for polymerization to yield a methylacrylic acid high carbon ester-N-

(Continued)

hexadecyl methacrylamide-vinyl acetate terpolymer, i.e., a nitrogen-containing terpolymer biodiesel solidification point depressant. Compared with the prior art, the nitrogen-containing terpolymer biodiesel solidification point depressant of the present invention solves the problem of poor compatibility of single methylacrylic acid depressants, N-hexadecyl methacrylamide and vinyl acetate are introduced to extend the composition of the depressant and improve a solidification point depression effect, the preparation process of the depressant is simple, and the experimental operation is convenient.

6 Claims, 1 Drawing Sheet

(56) References Cited

FOREIGN PATENT DOCUMENTS

| CN | 104371058 | A |   | 2/2015  |            |
|----|-----------|---|---|---------|------------|
| CN | 105524211 | A |   | 4/2016  |            |
| CN | 105542063 | A | * | 5/2016  | C08F 218/08 |
| CN | 105542063 | A |   | 5/2016  |            |
| CN | 110172366 | A | * | 8/2019  | C10L 1/1983 |
| CN | 111826222 | A |   | 10/2020 |            |
| DE | 4023578   | A | * | 1/1992  | A61L 27/16 |
| GB | 691965    | A |   | 5/1953  |            |

OTHER PUBLICATIONS

Machine Translation of CN-105542063-A (Year: 2016).*
Machine Translation of DE-4023578-A (Year: 1992).*
International Search Report in PCT/CN2021/096332, issued by ISA, dated Aug. 25, 2021.
Written Opinion of the International Search Report in PCT/CN2021/096332, issued by ISA, dated Aug. 25, 2021.
First official action based on priority CN202010489249.9, dated Oct. 28, 2021.
The notice of grant based on priority CN202010489249.9, dated Aug. 19, 2022.

* cited by examiner

NITROGEN-CONTAINING TERPOLYMER BIODIESEL SOLIDIFICATION POINT DEPRESSANT, AND PREPARATION METHOD AND APPLICATION THEREOF

TECHNICAL FIELD

The present invention belongs to the technical field of biodiesel solidification point depressants, and relates to a nitrogen-containing terpolymer biodiesel solidification point depressant, a preparation method and application thereof, which are used for improving the low-temperature fluidity of biodiesel.

BACKGROUND

Biodiesel is currently recognized as one of the most competitive green and renewable alternatives to petroleum diesel at home ands abroad. Especially for China, the development of the biodiesel industry can effectively promote China's rural and economic and social development, and is of great strategic significance to the adjustment of China's agricultural structure, energy security, and comprehensive management of the ecological environment.

Currently, there are many researches on development prospects, optimization of preparation methods, combustion and emission, safety and nontoxicity, green and environmental protection, and application of biodiesel in diesel engines in foreign countries. While, there are few researches on improvement of the low-temperature fluidity of biodiesel and its mechanism of action, which mainly focus on aspects such as winterization, mixing, and addition of depressants. There are fewer researches on this aspect in China, and especially there is no research on the mechanism of depression of a solidification point of biodiesel.

Low-temperature fluidity improvers, also known as solidification point depressants, are a class of petroleum product additives that can improve the crystallization of wax in petroleum products and depress a solidification point when added in a small amount, and are one of the cheapest, most flexible, and most promising methods to improve the low-temperature fluidity of biodiesel at present. Currently, domestic solidification point depressants mainly include: an ethylene-vinyl acetate copolymer, a maleic anhydride copolymer, a vinyl acetate-fumarate copolymer, alkenyl diamide acid salts, alkyl aromatics, acrylic copolymers, polar nitrogen-containing compounds, etc. Researches on these depressants are limited to single target biodiesel and single structures, and it is in lack of researches on the systemic structure-activity relationship and the compatibility of performance.

Therefore, development of an efficient and broad-spectrum biodiesel solidification point depressant is of great significance to development of high-quantity low temperature biodiesel.

SUMMARY OF THE INVENTION

An objective of the present invention is to provide a nitrogen-containing terpolymer biodiesel solidification point depressant, and a preparation method and application thereof.

The depressant is easy to synthesize, has the advantages of high oil solubility, low cost, and nontoxicity, can effectively improve the low-temperature fluidity of biodiesel, has good solidification point and cold filter plugging point depression effects, and meanwhile lays a theoretical foundation for the research and development of biodiesel solidification point depressants.

The objective of the present invention is achieved by the following technical solutions.

A preparation method of a nitrogen-containing terpolymer biodiesel solidification point depressant includes the following steps:

1) respectively preparing methylacrylic acid high carbon ester and N-hexadecyl methacrylamide (the methylacrylic acid high carbon ester is prepared by esterification, and the N-hexadecyl methacrylamide is prepared by acylation); and
2) adding the methylacrylic acid high carbon ester, the N-hexadecyl methacrylamide, and vinyl acetate to a solvent, and adding an initiator for polymerization to yield a methylacrylic acid high carbon ester-N-hexadecyl methacrylamide-vinyl acetate terpolymer, i.e., a nitrogen-containing terpolymer biodiesel solidification point depressant.

Further, at step 1), a preparation method of the methylacrylic acid high carbon ester includes the following steps: adding methylacrylic acid, a higher alcohol, and a polymerization inhibitor to a solvent, heating the mixture to 55-65° C. for full dissolution, and adding a catalyst for catalysis to yield methylacrylic acid high carbon ester.

Further, the higher alcohol includes one or more of tetradecanol, hexadecanol, and octadecanol, the polymerization inhibitor is hydroquinone, the catalyst is p-toluenesulfonic acid, the solvent is toluene; a molar ratio of the methylacrylic acid to the higher alcohol is (1.1-1.3):1, the mass of the polymerization inhibitor is 0.5%-0.7% of the total mass of the methylacrylic acid and the higher alcohol, and the mass of the catalyst is 0.7%-0.9% of the total mass of the methylacrylic acid and the higher alcohol.

Further, in the catalysis process, the reaction temperature is 110-120° C., and the reaction time is 5-6 h.

Further, at step 1), a preparation method of the N-hexadecyl methacrylamide includes the following steps: adding hexadecylamine (and an acid-binding agent) to a solvent, adding methacryloyl chloride to react with the hexadecylamine at 55-65° C. for 1.5-2.5 h, and drying the reaction product to yield N-hexadecyl methacrylamide.

Further, the acid-binding agent is anhydrous potassium carbonate, the solvent is N,N-dimethylformamide, and a molar ratio of the methacryloyl chloride to the hexadecylamine to the acid-binding agent is (1.1-1.3):(0.9-1.1):1.

Further, at step 2), the solvent is toluene, the initiator is benzoyl peroxide; a molar ratio of the methylacrylic acid high carbon ester to the N-hexadecyl methacrylamide to the vinyl acetate is (4-6):(0.9-1.1):1, the mass of the initiator is 0.8%-1.2% of the total mass of the methylacrylic acid high carbon ester, the N-hexadecyl methacrylamide, and the vinyl acetate.

Further, at step 2), before the initiator is added, air in the reaction system is removed; and in the polymerization process, the reaction temperature is 90-110° C., and the reaction time is 7-8 h.

Reaction formulas for preparing the above nitrogen-containing terpolymer biodiesel solidification point depressant are as follows:

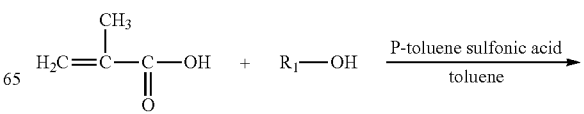

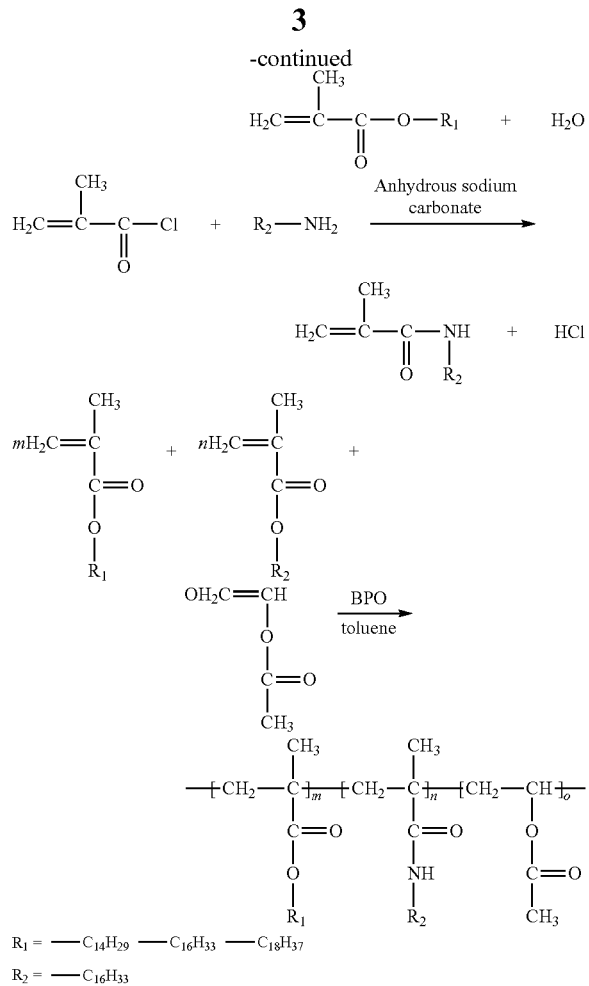

A nitrogen-containing terpolymer biodiesel solidification point depressant is prepared by the method.

A nitrogen-containing terpolymer biodiesel solidification point depressant is applied to biodiesel.

In the present invention, the biodiesel solidification point depressant consists of three monomers, i.e., methylacrylic acid high carbon ester, N-hexadecyl methacrylamide, and vinyl acetate, due to the presence of long alkyl chains in the methylacrylic acid high carbon ester and N-hexadecyl methacrylamide molecules, the depressant has good oil solubility, and amide groups in the N-hexadecyl methacrylamide and the vinyl acetate molecule can provide certain polar groups that are absorbed on the surface of wax crystals to produce a certain repulsive force for hindering the accumulation of wax crystals, thereby achieving a good solidification point depression effect. The structure-activity relationship provides a new research idea of depression of a solidification point of biodiesel.

Compared with the prior art, the present invention has the following characteristics.

1) The nitrogen-containing terpolymer biodiesel solidification point depressant prepared in the present invention can be well dissolved in biodiesel. Long alkyl chains provided by methylacrylic acid high carbon ester can effectively improve the low-temperature fluidity of biodiesel through eutectic action. N-hexadecyl methacrylamide and vinyl acetate can provide corresponding polar groups that are absorbed on the surface of wax crystals precipitated from biodiesel to produce a repulsive force for hindering the accumulation of wax crystals, thereby significantly depressing a solidification point and a cold filter plugging point of the biodiesel.

2) The preparation process of the nitrogen-containing terpolymer biodiesel solidification point depressant of the present invention is simple, the system is more complex, which helps to stabilize the performance of the system, the experimental operation is convenient, and solidification point and cold filter plugging point depression effects are significant.

DETAILED DESCRIPTION OF THE PREFERRED EMBODIMENTS

Figure 1:
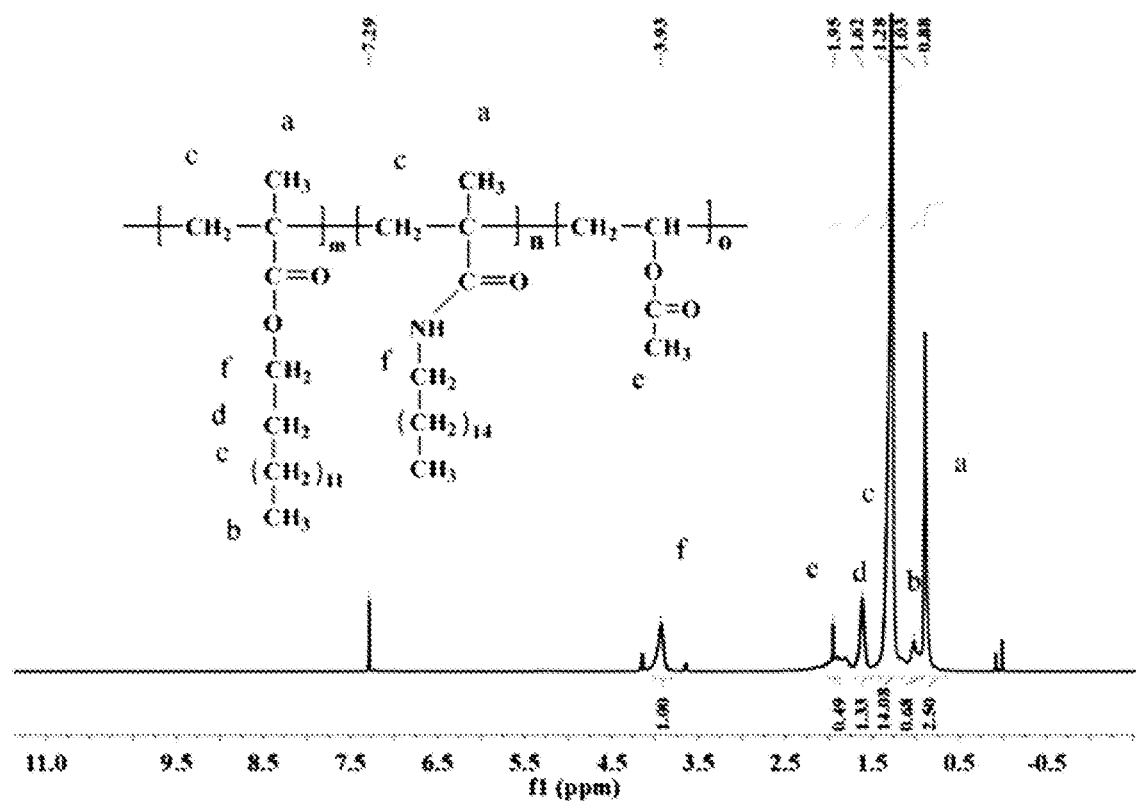
FIG. 1 is a 1HNMR diagram of a methylacrylic acid high carbon ester-N-hexadecyl methacrylamide-vinyl acetate polymer prepared in Example 1 (m, n, and o are integers greater than or equal to 1)

The present invention will be described in detail below with reference to the drawings and specific examples. The examples are implemented on the basis of the technical solutions of the present invention, detailed implementation modes and specific operation processes are given, but the scope of protection of the present invention is not limited to the following examples.

In the examples of the present inventions, cold filter plugging points are determined in accordance with SH/T0248-2006 Diesel and Domestic Heating Fuels—Determination of Cold Filter Plugging Point, and solidification points are determined in accordance with GB510-83 Petroleum Products—Determination of Solidification Point.

Example 1

(1) 10.33 g (0.12 mol) of methylacrylic acid, 21.44 g (0.1 mol) of tetradecanol, 0.192 g of hydroquinone, and 50 mL of toluene were placed in a three-necked flask equipped with a condensation pipe, a water separator, a thermometer, and a magnetic stirrer, the mixture was heated to 60° C. such that the tetradecanol was fully dissolved in the toluene, 0.254 g of p-toluenesulfonic acid serving as a catalyst was quickly placed in the three-necked flask, the mixture was heated to 110-120° C. and reacted for 5 h, when it was observed that the water volume in the water separator was equivalent to a theoretical value, the system was in a pale yellow transparent liquid form, and the reaction was terminated. After the reaction was completed, and an obtained reaction solution was distilled under reduced pressure to remove the solvent, washed with an alkali, that is, washed with a NaOH solution with a mass fraction of 5% to remove the p-toluenesulfonic acid and unreacted methylacrylic acid, and normally washed 3 or 4 times until the solution was weakly alkaline, washed with distilled water until the solution was neutral, and dried in vacuum at 60° C. for 5 h to yield tetradecyl methacrylate.

2.414 g (0.1 mol) of hexadecylamine and 20 mL of N,N-dimethylformamide were placed in a three-necked flask equipped with a condensation pipe, a thermometer, a constant pressure dropping funnel, and a magnetic stirrer, the mixture was heated to 60° C. such that the hexadecylamine was in full contact with the N,N-dimethylformamide, 1.254 g (0.12 mol) of methacryloyl chloride was slowly added dropwise, the mixture reacted for 2 h, washed with water, and subjected to suction filtration repeatedly, and an obtained filter cake was dried at 30° C. for 8 h to yield N-hexadecyl methacrylamide.

(2) 14.13 g (0.05 mol) of tetradecyl methacrylate, 3.09 g (0.01 mol) of N-hexadecyl methacrylamide, 0.86 g (0.01 mol) of vinyl acetate, and 25 mL of toluene serving as a solvent were placed in sequence in a three-necked flask equipped with an electric stirrer, a temperature controller, a constant pressure dropping funnel, a reflux condensation pipe, and a nitrogen gas ingress pipe, the mixture was heated to 50-60° C. such that the reactants were fully dissolved, and meanwhile, nitrogen gas was injected into the three-necked flask for 2-3 min, the three-necked flask was vacuumized for 1-2 min, and the operation was repeated 3 times to remove air in the reaction system. When the reaction temperature was 105° C., a toluene solution in which 0.18 g of benzoyl peroxide was dissolved was slowly added dropwise (within 30-45 min), and the mixture was stirred and refluxed for 8 h. After the reaction solution was cooled to the room temperature, excessive methanol was dropwise added to the reaction solution, when white precipitates were produced, a supernatant was separated, and the precipitates were dissolved in toluene. The above steps were repeated 3 or 4 times to remove the benzoyl peroxide in the system, and obtained precipitates were placed in a vacuum dryer and dried in vacuum at 50° C. for 5 h to yield a tetradecyl methacrylate-N-hexadecyl methacrylamide-vinyl acetate terpolymer. The molecular Mw of the terpolymer measured by GPC is 91472 g/mol, Mn is 33904 g/mol, and Mw/Mn is 2.698.

Figure 2:
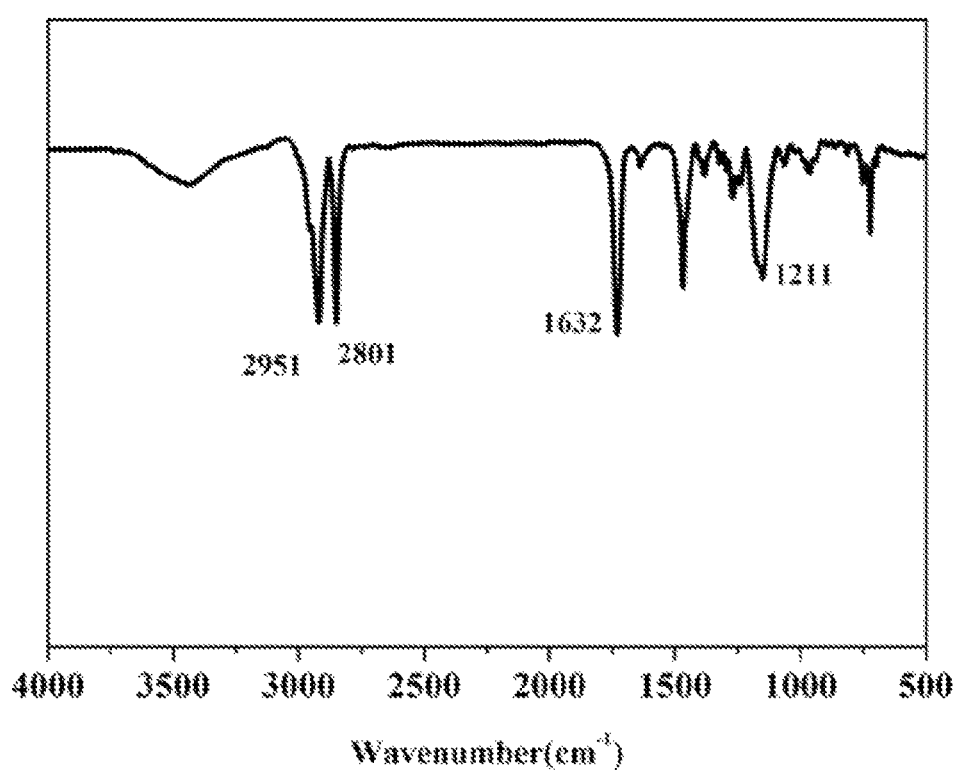
FIG. 2 is an infrared diagram of the methylacrylic acid high carbon ester-N-hexadecyl methacrylamide-vinyl acetate polymer prepared in Example 1.

The nuclear magnetic resonance characterization of the obtained product is shown in FIG. 1, and the infrared characterization is shown in FIG. 2.

Example 2

Differences between this example and Example 1 were that: at step (1), 21.44 g (0.1 mol) of tetradecanol and 0.254 g of p-toluenesulfonic acid serving as a catalyst were replaced with 24.24 g of hexadecanol and 0.277 g of p-toluenesulfonic acid serving as a catalyst, and at step (2), 14.13 g (0.05 mol) of tetradecyl methacrylate and 0.18 g of benzoyl peroxide were replaced with 15.53 g (0.05 mol) of hexadecyl methacrylate and 0.184 g of benzoyl peroxide.

Example 3

Differences between this example and Example 1 were that: at step (1), 21.44 g (0.1 mol) of tetradecanol and 0.254 g of p-toluenesulfonic acid serving as a catalyst were replaced with 27.05 g of octadecanol and 0.299 g of p-toluenesulfonic acid serving as a catalyst, and at step (2), 14.13 g (0.05 mol) of tetradecyl methacrylate and 0.18 g of benzoyl peroxide were replaced with 16.9 g (0.05 mol) of octadecyl methacrylate and 0.198 g of benzoyl peroxide.

Example 4

A difference between this example and Example 1 was that: at step (2), 14.13 g (0.05 mol) of tetradecyl methacrylate and 0.18 g of benzoyl peroxide were replaced with 28.25 g (0.1 mol) of tetradecyl methacrylate and 0.3220 g of benzoyl peroxide.

Example 5

A difference between this example and Example 1 was that: at step (2), 14.13 g (0.05 mol) of tetradecyl methacrylate and 0.18 g of benzoyl peroxide were replaced with 42.37 g (0.15 mol) of tetradecyl methacrylate and 0.4632 g of benzoyl peroxide.

Application Example

The nitrogen-containing terpolymer biodiesel solidification point depressants prepared in Examples 1 to 5 were used for testing low-temperature fluidity in accordance with a method in the national standard GB510-83. The operation steps were as follows: a test sample was placed in a tube, after the test sample was cooled to preset temperature, the tube was tilted 45° for 1 min, whether the liquid level moved was observed, and an arithmetic mean value of two repeated test results was taken as a solidification point of the sample.

The solidification point depressants prepared in Examples 1 to 5 were respectively numbered 1 #, 2 #, 3 #, 4 #, and 5 #, and respectively added to two different biodiesel according to different mass percentages, and solidification points of the biodiesel were tested. Solidification point depression effects are specifically shown in Tables 1 and 2.

TABLE 1

|  | Addition amount of depressant | SP (° C.) | ΔSP (° C.) |
|---|---|---|---|
| Waste oil biodiesel | 0 | 5 |  |
| Waste oil biodiesel added with 1# | 0.25% | 3 | 2 |
|  | 0.5% | 2 | 3 |
| Waste oil biodiesel added with 2# | 0.25% | 4 | 1 |
|  | 0.5% | 3 | 2 |
| Waste oil biodiesel added with 3# | 0.25% | 4 | 1 |
|  | 0.5% | 4 | 1 |
| Waste oil biodiesel added with 4# | 0.25% | 2 | 3 |
|  | 0.5% | −1 | 6 |
| Waste oil biodiesel added with 5# | 0.25% | 3 | 2 |
|  | 0.5% | 1 | 4 |

TABLE 2

|  | Addition amount of depressant | SP (° C.) | ΔSP (° C.) |
|---|---|---|---|
| Castor oil biodiesel | 0 | 3 |  |
| Castor oil biodiesel added with 1# | 0.25% | 1 | 2 |
|  | 0.5% | 0 | 3 |
| Castor oil biodiesel added with 2# | 0.25% | 2 | 1 |
|  | 0.5% | 0 | 3 |
| Castor oil biodiesel added with 3# | 0.25% | 2 | 1 |
|  | 0.5% | 2 | 1 |
| Castor oil biodiesel added with 4# | 0.25% | 0 | 3 |
|  | 0.5% | −2 | 5 |
| Castor oil biodiesel added with 5# | 0.25% | 1 | 2 |
|  | 0.5% | 0 | 3 |

ΔSP refers to a depression value of a solidification point of biodiesel added with a solidification point depressant relative to pure biodiesel. It can be seen from Tables 1 and 2 that the solidification point depressants 1 #, 2 #, 3 #, 4 #, and 5 #can effectively depress the solidification points of the biodiesel. The solidification point depressant 4 #prepared in Example 4 achieves the best effect, and when an addition amount is 0.5%, ΔSP of the waste oil biodiesel and ΔSP of the castor oil biodiesel are respectively 6° C. and 5° C.

The terpolymer biodiesel solidification point depressants prepared in Examples 1 to 5 were used for testing cold filter plugging points of biodiesel in accordance with a method in the national standard SH/T0248-2006. A cold filter plugging point is the highest temperature at which the volume of liquid test sample passing through a filter does not exceed 20 mL within the specified time. An arithmetic mean value of two repeated test results was taken as a cold filter plugging point of the sample.

The solidification point depressants prepared in Examples 1 to 5 were respectively numbered 1 #, 2 #, 3 #, 4 #, and 5 #, and respectively added to biodiesel according to different mass percentages, and cold filter plugging points of the biodiesel were tested. Cold filter plugging point depression effects are specifically shown in Tables 3 and 4.

TABLE 3

|  | Addition amount of depressant | CFPP (° C.) | ΔCFPP (° C.) |
| --- | --- | --- | --- |
| Waste oil biodiesel | 0 | 6 |  |
| Waste oil biodiesel added with 1# | 0.25% | 4 | 2 |
|  | 0.5% | 2 | 4 |
| Waste oil biodiesel added with 2# | 0.25% | 5 | 1 |
|  | 0.5% | 2 | 4 |
| Waste oil biodiesel added with 3# | 0.25% | 5 | 1 |
|  | 0.5% | 4 | 2 |
| Waste oil biodiesel added with 4# | 0.25% | 3 | 3 |
|  | 0.5% | 1 | 5 |
| Waste oil biodiesel added with 5# | 0.25% | 4 | 2 |
|  | 0.5% | 2 | 4 |

TABLE 4

|  | Addition amount of depressant | CFPP (° C.) | ΔCFPP (° C.) |
| --- | --- | --- | --- |
| Castor oil biodiesel | 0 | 4 |  |
| Castor oil biodiesel added with 1# | 0.25% | 2 | 2 |
|  | 0.5% | 1 | 3 |
| Castor oil biodiesel added with 2# | 0.25% | 2 | 2 |
|  | 0.5% | 2 | 2 |
| Castor oil biodiesel added with 3# | 0.25% | 3 | 1 |
|  | 0.5% | 3 | 1 |
| Castor oil biodiesel added with 4# | 0.25% | 1 | 3 |
|  | 0.5% | −1 | 5 |
| Castor oil biodiesel added with 5# | 0.25% | 2 | 2 |
|  | 0.5% | 0 | 4 |

ΔCFPP refers to a depression value of a cold filter plugging point of biodiesel added with a solidification point depressant relative to pure biodiesel. It can be seen from Tables 3 and 4 that the solidification point depressants 1 #, 2 #, 3 #, 4 #, and 5 #can depress the cold filter plugging points of the biodiesel to certain extents, thereby having general applicability. The solidification point depressant prepared in Example 4 achieves a good cold filter plugging point depression effect, and when an addition amount is 0.5%, ΔCFPP of the waste oil biodiesel and ΔCFPP of the castor oil biodiesel are respectively 5° C. and 5° C.

In conclusion, the nitrogen-containing terpolymer biodiesel solidification point depressants of the present invention solve the problem of poor compatibility of single methylacrylic acid depressants, and N-hexadecyl methacrylamide and vinyl acetate are introduced to extend the composition of the depressant and improve a solidification point depression effect. A solidification point and a cold filter plugging point of biodiesel can be respectively depressed by 1-6° C. and 1-5° C.

Example 6

A preparation method of a nitrogen-containing terpolymer biodiesel solidification point depressant includes the following steps.

1) Methylacrylic acid high carbon ester and N-hexadecyl methacrylamide are respectively prepared.

A preparation method of the methylacrylic acid high carbon ester includes the following steps: methylacrylic acid, a higher alcohol, and a polymerization inhibitor are added to a solvent, the mixture is heated to 55° C. for full dissolution, and a catalyst is added for catalysis to yield methylacrylic acid high carbon ester. The higher alcohol is tetradecanol, the polymerization inhibitor is hydroquinone, the catalyst is p-toluenesulfonic acid, the solvent is toluene; a molar ratio of the methylacrylic acid to the higher alcohol is 1.3:1, the mass of the polymerization inhibitor is 0.5% of the total mass of the methylacrylic acid and the higher alcohol, and the mass of the catalyst is 0.9% of the total mass of the methylacrylic acid and the higher alcohol. In the catalysis process, the reaction temperature is 110° C., and the reaction time is 6 h.

A preparation method of the N-hexadecyl methacrylamide includes the following steps: hexadecylamine is added to a solvent, methacryloyl chloride is added to react with the hexadecylamine at 55° C. for 2.5 h, and the reaction product is dried to yield N-hexadecyl methacrylamide. The solvent is N,N-dimethylformamide; and a molar ratio of the methacryloyl chloride to the hexadecylamine is 1.1:1.1:1.

2) The methylacrylic acid high carbon ester, the N-hexadecyl methacrylamide, and vinyl acetate are added to a solvent, and an initiator is added for polymerization to yield a methylacrylic acid high carbon ester-N-hexadecyl methacrylamide-vinyl acetate terpolymer, i.e., a nitrogen-containing terpolymer biodiesel solidification point depressant. The solvent is toluene, the initiator is benzoyl peroxide; a molar ratio of the methylacrylic acid high carbon ester to the N-hexadecyl methacrylamide to the vinyl acetate is 4:1.1:1, and the mass of the initiator is 0.8% of the total mass of the methylacrylic acid high carbon ester, the N-hexadecyl methacrylamide, and the vinyl acetate. Before the initiator is added, air in the reaction system is removed; and in the polymerization process, the reaction temperature is 110° C., and the reaction time is 7 h.

Example 7

A preparation method of a nitrogen-containing terpolymer biodiesel solidification point depressant includes the following steps.

1) Methylacrylic acid high carbon ester and N-hexadecyl methacrylamide are respectively prepared.

A preparation method of the methylacrylic acid high carbon ester includes the following steps: methylacrylic acid, a higher alcohol, and a polymerization inhibitor are added to a solvent, the mixture is heated to 65° C. for full dissolution, and a catalyst is added for catalysis to yield methylacrylic acid high carbon ester. The higher alcohol is hexadecanol, the polymerization inhibitor is hydroquinone, the catalyst is p-toluenesulfonic acid, the solvent is toluene; a molar ratio of the methylacrylic acid to the higher alcohol is 1.1:1, the mass of the polymerization inhibitor is 0.7% of the total mass of the methylacrylic acid and the higher alcohol, and the mass of the catalyst is 0.7% of the total mass of the methylacrylic acid and the higher alcohol. In the catalysis process, the reaction temperature is 120° C., and the reaction time is 5 h.

A preparation process of the N-hexadecyl methacrylamide includes the following steps: hexadecylamine is added to a solvent, methacryloyl chloride is added to react with the hexadecylamine at 65° C. for 1.5 h, and the reaction product is dried to yield N-hexadecyl methacrylamide. The solvent is N,N-dimethylformamide; and a molar ratio of the methacryloyl chloride to the hexadecylamine is 1.3:0.9:1.

2) The methylacrylic acid high carbon ester, the N-hexadecyl methacrylamide, and vinyl acetate are added to a solvent, and an initiator is added for polymerization to yield a methylacrylic acid high carbon ester-N-hexadecyl methacrylamide-vinyl acetate terpolymer, i.e., a nitrogen-containing terpolymer biodiesel solidification point depressant. The solvent is toluene, the initiator is benzoyl peroxide; a molar ratio of the methylacrylic acid high carbon ester to the N-hexadecyl methacrylamide to the vinyl acetate is 6:0.9:1, and the mass of the initiator is 1.2% of the total mass of the methylacrylic acid high carbon ester, the N-hexadecyl methacrylamide, and the vinyl acetate. Before the initiator is added, air in the reaction system is removed; and in the polymerization process, the reaction temperature is 90° C., and the reaction time is 8 h.

Example 8

A preparation method of a nitrogen-containing terpolymer biodiesel solidification point depressant includes the following steps.

1) Methylacrylic acid high carbon ester and N-hexadecyl methacrylamide are respectively prepared.

A preparation method of the methylacrylic acid high carbon ester includes the following steps: methylacrylic acid, a higher alcohol, and a polymerization inhibitor are added to a solvent, the mixture is heated to 60° C. for full dissolution, and a catalyst is added for catalysis to yield methylacrylic acid high carbon ester. The higher alcohol is octadecanol, the polymerization inhibitor is hydroquinone, the catalyst is p-toluenesulfonic acid, the solvent is toluene; a molar ratio of the methylacrylic acid to the higher alcohol is 1.2:1, the mass of the polymerization inhibitor is 0.6% of the total mass of the methylacrylic acid and the higher alcohol, and the mass of the catalyst is 0.8% of the total mass of the methylacrylic acid and the higher alcohol. In the catalysis process, the reaction temperature is 115° C., and the reaction time is 5.5 h.

A preparation method of the N-hexadecyl methacrylamide includes the following steps: hexadecylamine is added to a solvent, methacryloyl chloride is added to react with the hexadecylamine at 60° C. for 2 h, and the reaction product is dried to yield N-hexadecyl methacrylamide. The solvent is N,N-dimethylformamide; and a molar ratio of the methacryloyl chloride to the hexadecylamine is 1.2:1:1.

2) The methylacrylic acid high carbon ester, the N-hexadecyl methacrylamide, and vinyl acetate are added to a solvent, and an initiator is added for polymerization to yield a methylacrylic acid high carbon ester-N-hexadecyl methacrylamide-vinyl acetate terpolymer, i.e., a nitrogen-containing terpolymer biodiesel solidification point depressant. The solvent is toluene, the initiator is benzoyl peroxide; a molar ratio of the methylacrylic acid high carbon ester to the N-hexadecyl methacrylamide to the vinyl acetate is 5:1:1, and the mass of the initiator is 1% of the total mass of the methylacrylic acid high carbon ester, the N-hexadecyl methacrylamide, and the vinyl acetate. Before the initiator is added, air in the reaction system is removed; and in the polymerization process, the reaction temperature is 100° C., and the reaction time is 7.5 h.

The above description of the examples is for those of ordinary skill in the art to understand and implement the present invention. It is obvious that those skilled in the art may easily make various modifications to these examples, and apply the general principles described here to other examples without involving any creative effort. Therefore, the present invention is not limited to the above examples, and improvements and modifications made by those skilled in the art based on the disclosure of the present invention without departing from the scope of the present invention shall fall within the scope of protection of the present invention.

The invention claimed is:

1. A preparation method of a nitrogen-containing terpolymer biodiesel solidification point depressant, comprising the following steps:
   1) respectively preparing methylacrylic acid high carbon ester and N-hexadecyl methacrylamide; and
   2) adding the methylacrylic acid high carbon ester, the N-hexadecyl methacrylamide, and vinyl acetate to a first solvent, and adding an initiator for polymerization to yield a methylacrylic acid high carbon ester-N-hexadecyl methacrylamide-vinyl acetate terpolymer, i.e., a nitrogen-containing terpolymer biodiesel solidification point depressant;
   wherein the step of preparing methylacrylic acid high carbon ester comprises:
      adding a mixture of methylacrylic acid, a higher alcohol, and a polymerization inhibitor to a second solvent,
      heating the mixture to 55-65° C. for full dissolution, and
      adding a catalyst for catalysis to yield methylacrylic acid high carbon ester; and
   wherein the step of preparing N-hexadecyl methacrylamide comprising:
      adding hexadecylamine to a third solvent,
      adding methacryloyl chloride to react with the hexadecylamine at 55-65° C. for 1.5-2.5 h, and
      drying the reaction product to yield N-hexadecyl methacrylamide.

2. The preparation method of a nitrogen-containing terpolymer biodiesel solidification point depressant according to claim 1, characterized in that the higher alcohol comprises one or more of tetradecanol, hexadecanol, and octadecanol, the polymerization inhibitor is hydroquinone, the catalyst is p-toluenesulfonic acid, the second solvent is toluene; a molar ratio of the methylacrylic acid to the higher alcohol is (1.1-1.3):1, the mass of the polymerization inhibitor is 0.5%-0.7% of the total mass of the methylacrylic acid and the higher alcohol, and the mass of the catalyst is 0.7%-0.9% of the total mass of the methylacrylic acid and the higher alcohol.

3. The preparation method of a nitrogen-containing terpolymer biodiesel solidification point depressant according to claim 1, characterized in that in the catalysis process, the reaction temperature is 110-120° C., and the reaction time is 5-6 h.

4. The preparation method of a nitrogen-containing terpolymer biodiesel solidification point depressant according to claim 1, characterized in that the third solvent is N,N-dimethylformamide; and a molar ratio of the methacryloyl chloride to the hexadecylamine is (1.1-1.3):(0.9-1.1):1.

5. The preparation method of a nitrogen-containing terpolymer biodiesel solidification point depressant according to claim 1, characterized in that at step 2), the first solvent is toluene, the initiator is benzoyl peroxide; a molar ratio of the methylacrylic acid high carbon ester to the N-hexadecyl methacrylamide to the vinyl acetate is (4-6):(0.9-1.1):1, the mass of the initiator is 0.8%-1.2% of the total mass of the methylacrylic acid high carbon ester, the N-hexadecyl methacrylamide, and the vinyl acetate.

6. The preparation method of a nitrogen-containing terpolymer biodiesel solidification point depressant according to claim 1, characterized in that at step 2), before the initiator is added, air in the reaction system is removed; and in the polymerization process, the reaction temperature is 90-110° C., and the reaction time is 7-8 h.

* * * * *